US010207621B2

(12) United States Patent
Friemel et al.

(10) Patent No.: US 10,207,621 B2
(45) Date of Patent: Feb. 19, 2019

(54) ROTORCRAFT TRANSPORT TRAILER

(71) Applicants: Michael Jerome Friemel, Amarillo, TX (US); Michael Brett Friemel, Amarillo, TX (US)

(72) Inventors: Michael Jerome Friemel, Amarillo, TX (US); Michael Brett Friemel, Amarillo, TX (US)

( * ) Notice: Subject to any disclaimer, the term of this patent is extended or adjusted under 35 U.S.C. 154(b) by 0 days.

(21) Appl. No.: 15/636,782

(22) Filed: Jun. 29, 2017

(65) Prior Publication Data

US 2018/0001812 A1  Jan. 4, 2018

Related U.S. Application Data

(60) Provisional application No. 62/356,644, filed on Jun. 30, 2016.

(51) Int. Cl.
| | |
|---|---|
| *B60P 3/11* | (2006.01) |
| *B60P 1/52* | (2006.01) |
| *B62D 33/08* | (2006.01) |
| *B62D 63/08* | (2006.01) |
| *B62D 33/04* | (2006.01) |

(52) U.S. Cl.
CPC . *B60P 1/52* (2013.01); *B60P 3/11* (2013.01); *B62D 33/04* (2013.01); *B62D 33/08* (2013.01); *B62D 63/08* (2013.01)

(58) Field of Classification Search
CPC .................................. B60P 3/11; B62D 33/04
USPC ...................... 414/501, 491, 495; 410/92, 2; 244/110 R
See application file for complete search history.

(56) References Cited

U.S. PATENT DOCUMENTS

| | | | | | |
|---|---|---|---|---|---|
| 3,353,862 | A | * | 11/1967 | Tormolen .................. | B60P 3/11 296/26.03 |
| 4,060,145 | A | * | 11/1977 | Kingman ................. | B60G 5/04 280/423.1 |
| 4,061,353 | A | * | 12/1977 | Kingman ................ | B60P 1/025 280/423.1 |
| 4,474,359 | A | * | 10/1984 | Weaver ................ | B62D 53/062 254/8 C |
| 4,887,937 | A | * | 12/1989 | Thunnissen ............... | B60P 1/52 193/35 SS |
| 4,943,204 | A | * | 7/1990 | Ehrlich ..................... | B60P 1/02 187/211 |
| 8,152,100 | B2 | * | 4/2012 | Nicholas ................... | B60P 3/11 114/261 |
| 8,246,285 | B2 | * | 8/2012 | Maguin ..................... | B64F 1/32 182/113 |

(Continued)

*Primary Examiner* — Kaitlin S Joerger
(74) *Attorney, Agent, or Firm* — Scott L. Harper; Harper Bates & Champion LLP

(57) ABSTRACT

The invention disclosed herein comprises a trailer capable of transporting, storing, launching and recovering an aircraft, such as a helicopter or rotorcraft. The trailer includes a movable landing pad from which the aircraft is launched or lands upon and a sliding curtain wall which covers, extends and retracts to provide for secure storage of the aircraft while in transit. The trailer may be attached to and detached from a tractor, truck or other capable tow vehicle. In one embodiment directed to aerial spraying applications, the trailer also includes tankage and fluid transfer equipment and pumps for the storage and transfer of fuel, chemical and water supply, when aerial spray operations using the aircraft are being conducted in the field.

11 Claims, 5 Drawing Sheets

(56) References Cited

U.S. PATENT DOCUMENTS

| | | | |
|---|---|---|---|
| 8,573,916 B2* | 11/2013 | Hwu | B64F 1/22 |
| | | | 244/17.17 |
| 9,333,991 B2* | 5/2016 | Petelka | B62D 33/04 |
| 9,403,559 B1* | 8/2016 | Hadley | B60P 3/00 |
| 9,718,390 B1* | 8/2017 | Hadley | B60P 3/11 |
| 2007/0080557 A1* | 4/2007 | Knepper | B60J 7/02 |
| | | | 296/105 |
| 2009/0206629 A1* | 8/2009 | Damsi | B60J 7/102 |
| | | | 296/100.14 |

* cited by examiner

ROTORCRAFT TRANSPORT TRAILER

CROSS REFERENCE TO RELATED APPLICATION

This application claims the benefit of U.S. Provisional Patent Application Ser. No. 62/356,644, filed Jun. 30, 2016 and entitled "Rotorcraft Transport Trailer," which is hereby incorporated by reference for all purposes.

BACKGROUND

In the prior art, well known transport equipment such as a typical truck tractor attached to a flatbed trailer are used to transport overland both fixed wing and rotorcraft. The aircraft to be transported is tied with straps to the trailer to secure the aircraft. This prevents movement of the aircraft during transport. However, the aircraft is typically not covered during transport and is subject to being damaged from airborne debris encountered during transport. Likewise, the aircraft is exposed to the environmental conditions through which it is traveling and may suffer damage from rain, hail, or snowfall striking the exposed aircraft. Moreover, such trailer equipment does not allow or provide for the aircraft to take off from and land on the transport trailer on a repetitive basis. Further, no known trailer apparatus and techniques provide for the storage and transport of equipment and associated consumables which may be required for operation of the aircraft at the destination site, consequently requiring multiple transport trucks and trailer to deliver fuel, water, and chemical if the spray operations are involved, to the destination site.

Thus, there is a need for an aircraft transport trailer that provides a secure, covered trailer for transporting an aircraft overland and allows for the aircraft to use the trailer repeatedly as a take-off and landing pad. A need exists for an aircraft transport trailer and method which provides fuel, water and chemical storage, and associated pump transfer capabilities, so as to provide for the transfer of fuel and chemical to the aircraft while operating in the field.

SUMMARY OF THE INVENTION

The present disclosure includes a transport trailer capable of transporting, storing, launching and recovering an aircraft, such as a helicopter or rotorcraft. The trailer includes a movable landing pad from which the rotorcraft is launched or lands upon and a sliding curtain wall which covers, extends and retracts to provide for secure storage of the rotorcraft while in transit. The trailer may be attached to a tractor, truck or other capable tow vehicle. In one embodiment directed to aerial spraying applications, the trailer also includes tankage and fluid transfer equipment and pumps for the storage and transfer of fuel, chemical and water supply when aerial spray operations are being conducted in the field.

As disclosed herein, in order to safely accomplish launching and landing a helicopter on to the trailer landing pad, which is a safe distance from the trailer mounted water and chemical tankage, the invention includes a movable landing pad attached to a rail/roller system that allows the landing pad to be moved bi-directionally forward, over and behind the axle or axles of the trailer. The exterior landing surface of the landing pad may be coated with a rubber material to provide slip resistance when work is being performed on the pad. While the aircraft is enclosed for transport or storage, the landing pad is moved above or forward of the trailer axles via the rail/roller assembly for efficient weight distribution on the trailer and which allows for the extension of a slidable curtain wall with a swing door substantially around the periphery of the trailer providing a secure enclosure for the rotorcraft. When being readied for launch/landing operations, the sliding curtain wall is retracted towards the front of the trailer and the landing pad is moved to the rear portion of the trailer to provide the necessary clearance between rotor blade tips and the retracted sliding curtain wall to allow aircraft takeoff and landing operations to commence. The rotorcraft may then proceed on its mission and return to land on the landing pad where it may be refueled or resupplied, then resume operations in the area.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present invention generally provide trailer apparatus and methods that provide for the transport, launch and landing of an aircraft, such as a rotorcraft or helicopter, while in the field. The trailer apparatus and transport methods may comprise a plurality of different features, interactions, dynamics, abilities, and components, and are not to be limited to the specific implementations described herein.

Figure 1:
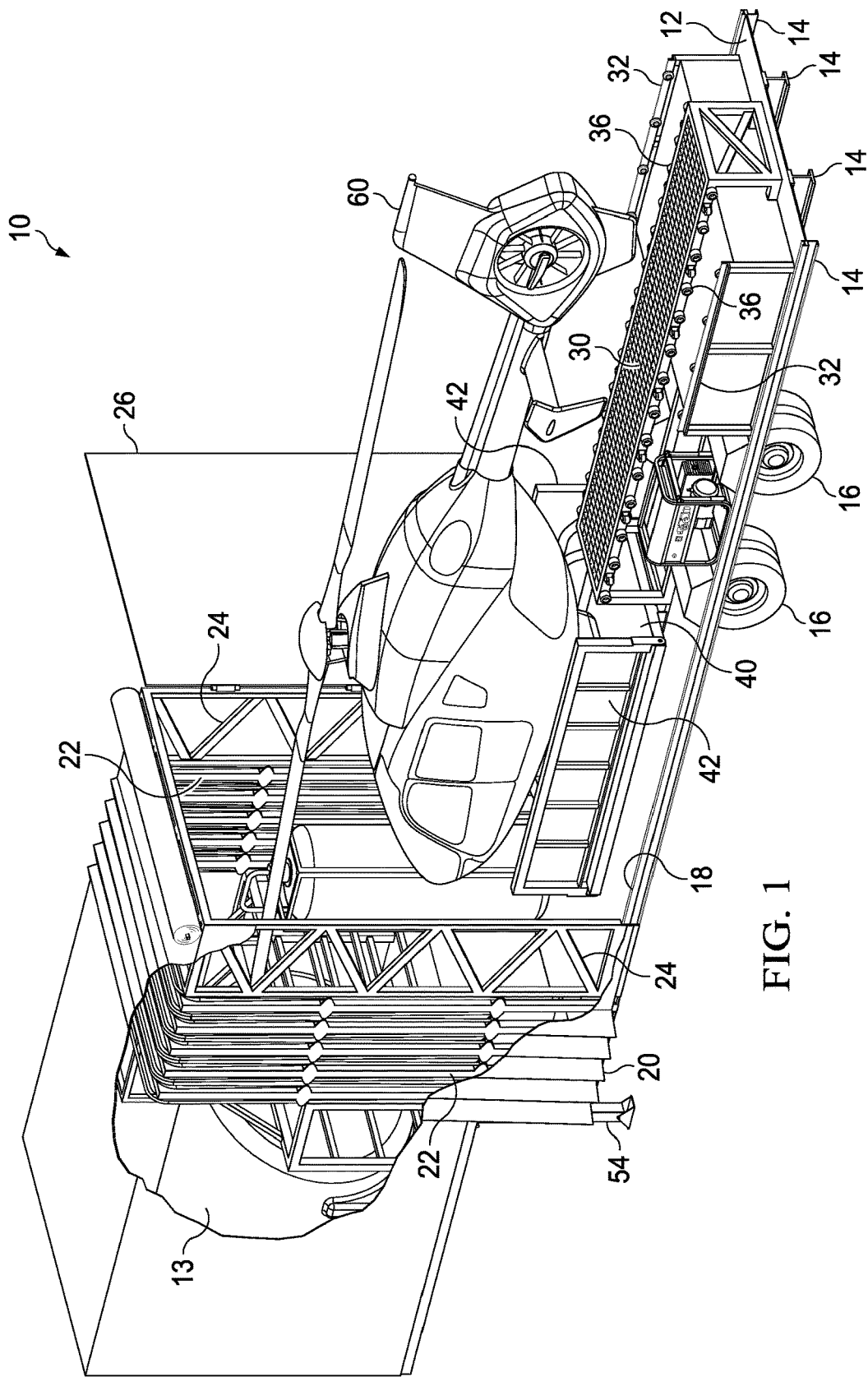
FIG. 1 illustrates a perspective view of a rotorcraft resting in the storage or transport position on the transport trailer according to a preferred embodiment of the present invention.
Figure 2:
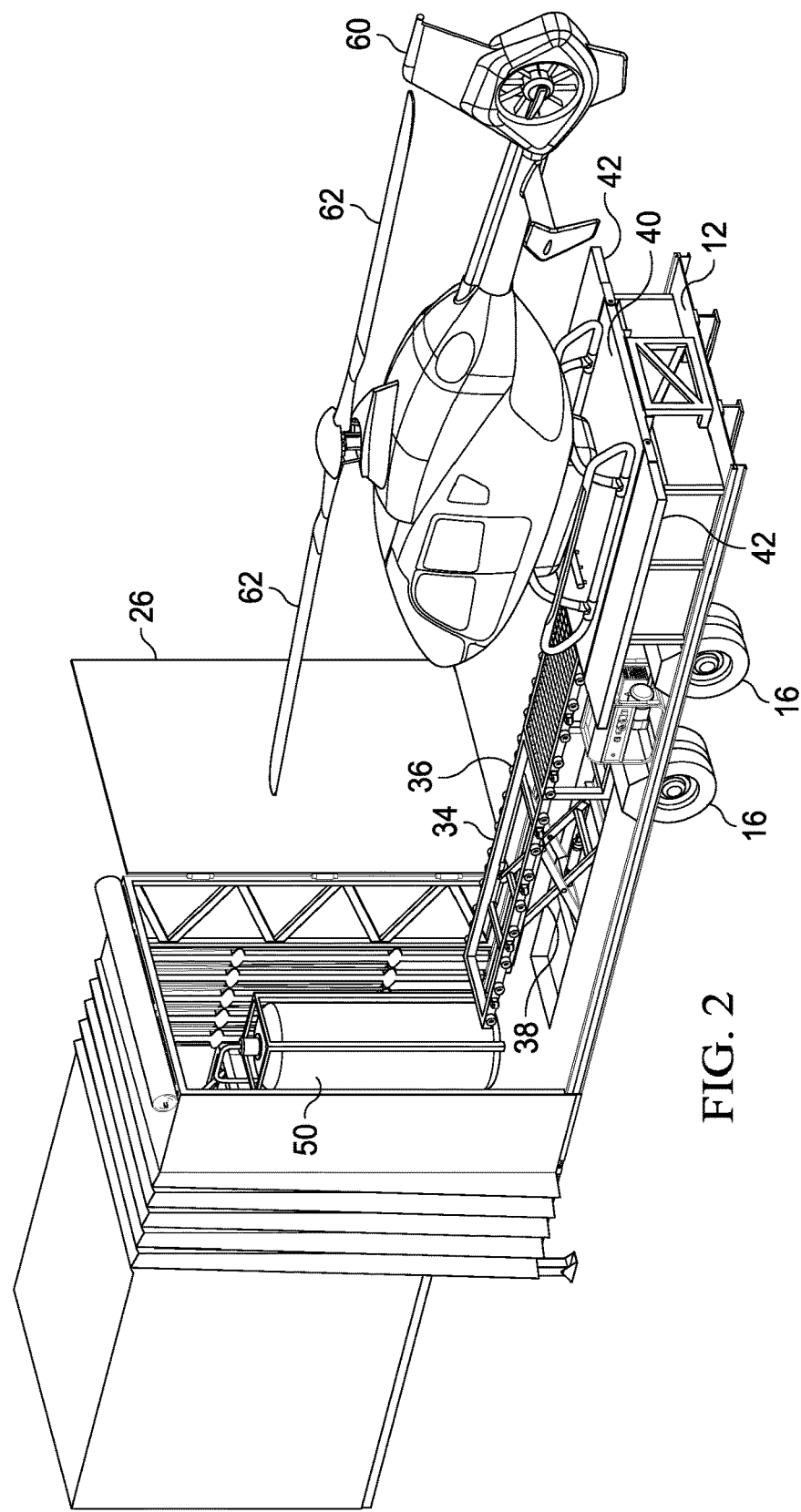
FIG. 2 illustrates a perspective view of a rotorcraft resting on the landing pad of the trailer in the launch or landing position according to a preferred embodiment of the present invention.
Figure 4:
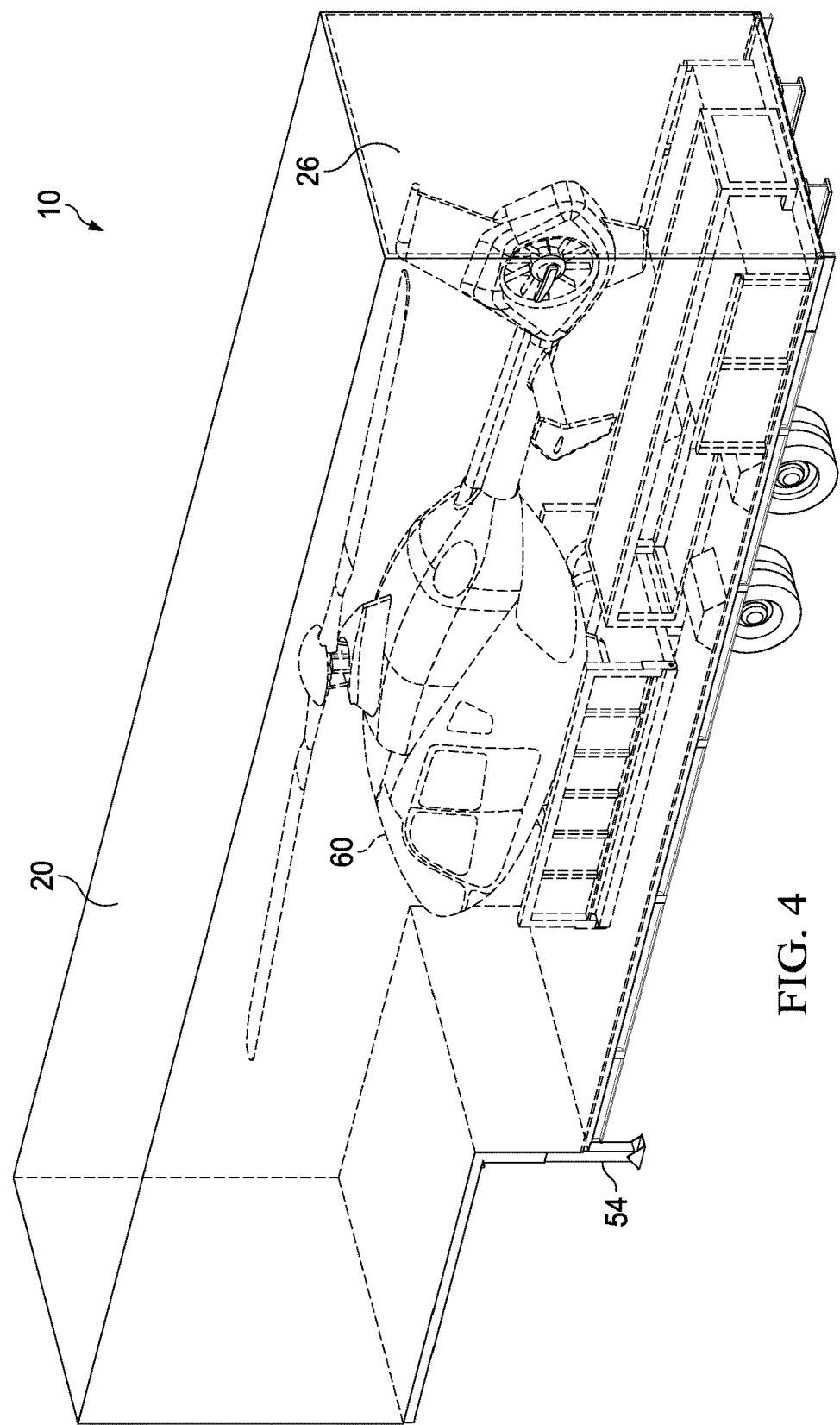
FIG. 4 illustrates a perspective view of the rotorcraft enclosed and secured within the trailer in the storage or transport configuration according to a preferred embodiment of the present invention.
Figure 5:
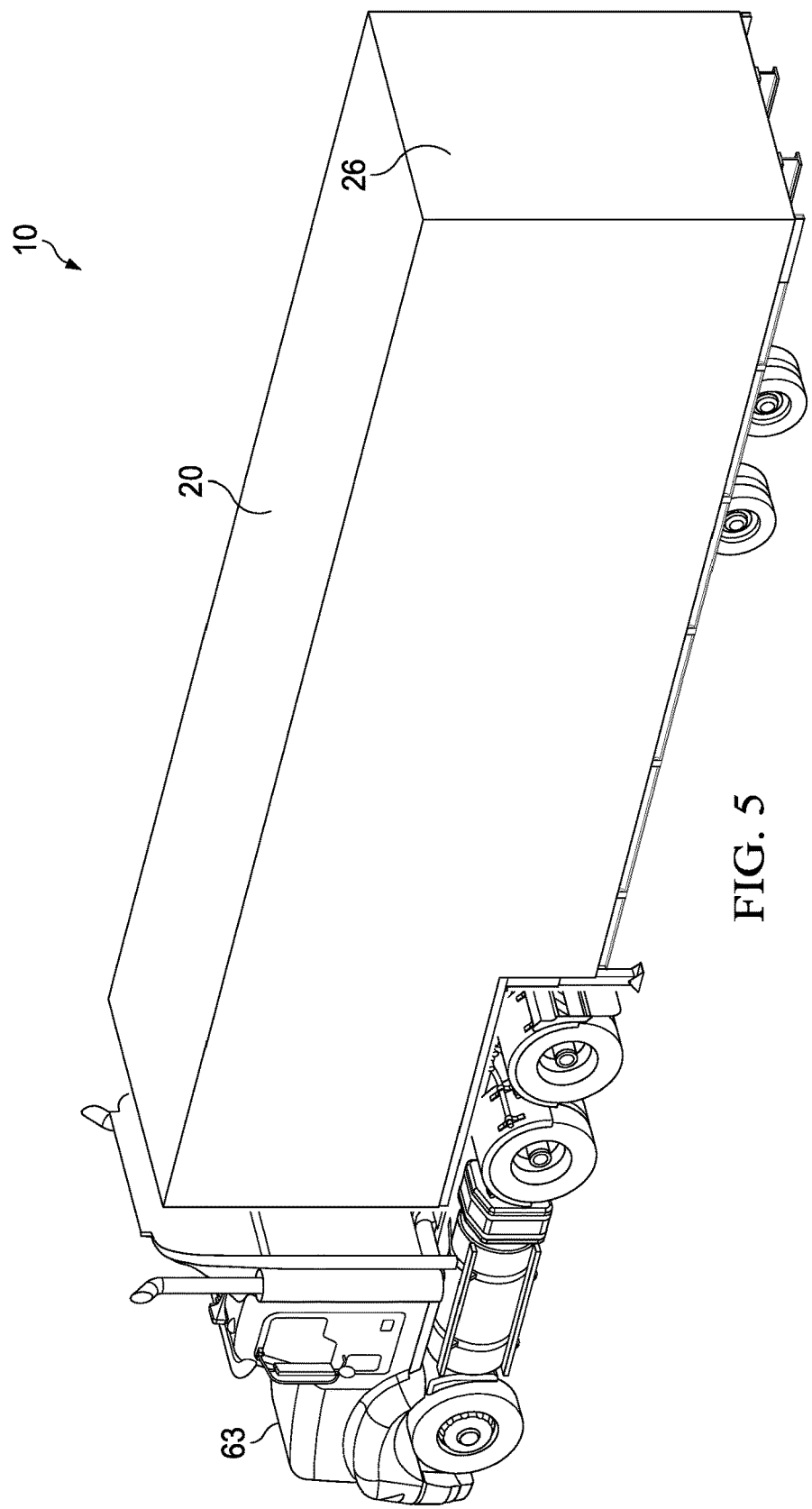
FIG. 5 illustrates a perspective view depicting the tractor and trailer providing for the enclosed and secured transport of a rotorcraft within the trailer according to a preferred embodiment of the present invention.

FIG. 1 depicts a perspective view of the transport trailer invention disclosed herein. Transport trailer 10 includes trailer bed 12 with an elevated forward storage area 13 which provides storage space for tanks, pumps and other associated equipment to provide for the storage and transport of fuel, water and chemical. Trailer bed 12 is supported by trailer frame 14 attached to axle wheels 16 as known in the trailer manufacturing art. In some embodiments, trailer bed 12 and trailer frame 14 may be made from other suitable materials, such as aluminum or metal alloys, or other material suited to bear the loads, stress and strain associated with trailering operations. One or multiple axle wheel assemblies 16 may be used to provide suitable load bearing capacity with the intended trailering application. In the depicted illustration, rotorcraft 60 is shown in the storage or transport configuration as pad 40 is positioned and secured forward of axle wheels 16 and in a lowered riding position which lowers the center of mass of rotorcraft 60 resulting in safer load positioning so as to reduce load tipping during transport. Rotorcraft 60 rests on pad 40 with pad wings 42 folded and pad 40 is fixed in position along a length of front rail 34 (shown in FIG. 2) while the trailer is in transport. As shown in FIG. 2, front rail 34 is attached to an elevator means. In the depicted embodiment, the elevator means includes scissor lift 38, which acts to elevate and lower front rail 34. It is contemplated that other known elevator means may be used to raise and lower front rail 34 which may include a screwjack, hydraulic or pneumatic or other known mechanical apparatus capable of raising and lowering front rail 34 according to the invention disclosed herein. Returning to FIG. 1, a slidable curtain wall 20, which is supported by spars 22 that are slidably attached to each other with joists 24. Curtain wall 20 is attached to trailer bed 12 with the spars 22 slidably engaged along wall rail 18. Curtain wall 20 may be retracted or extended along the entire length of trailer 10 as desired. When swing door 26 is closed at the aft end of trailer 10, an enclosed and secure space for housing and transporting rotorcraft 60 is created as shown in FIGS. 4 and 5.

With reference to FIG. 2, rotorcraft 60 is shown positioned in the launch and landing configuration. When moving the rotorcraft from the storage/transport position depicted in FIG. 1 to the launch/recover position shown in FIG. 2, swing door 26 is opened and curtain wall 20 is retracted to the front portion of trailer 10 uncovering rotorcraft 60 which is resting on pad 40. Pad 40 rests upon front rail 34 which includes rollers 36 spaced along opposing sides of front rail 34. Scissor lift 38 is in mechanical communication with pad 40 and acts to raise and lower pad 40 in substantial proximity to back rail 30. Back rail 30 extends to the rear of trailer bed 12 and includes rollers 36 attached to and spaced along opposing sides of back rail 30 as shown in FIGS. 1 and 2. Side rails 32 are located on along the aft sides of trailer bed 12 and include rollers 36 spaced along the length of each back rail 30. Scissor lift 38 is actuated to elevate front rail 34 to a level substantially even with back rail 30 so that pad 40 may be moved and translated, by hand or mechanically, along the length of front rail 34 and back rail 30 so as to move the position of rotorcraft 60 over the axle wheels 16 to the rear portion of trailer 10.

Figure 3:
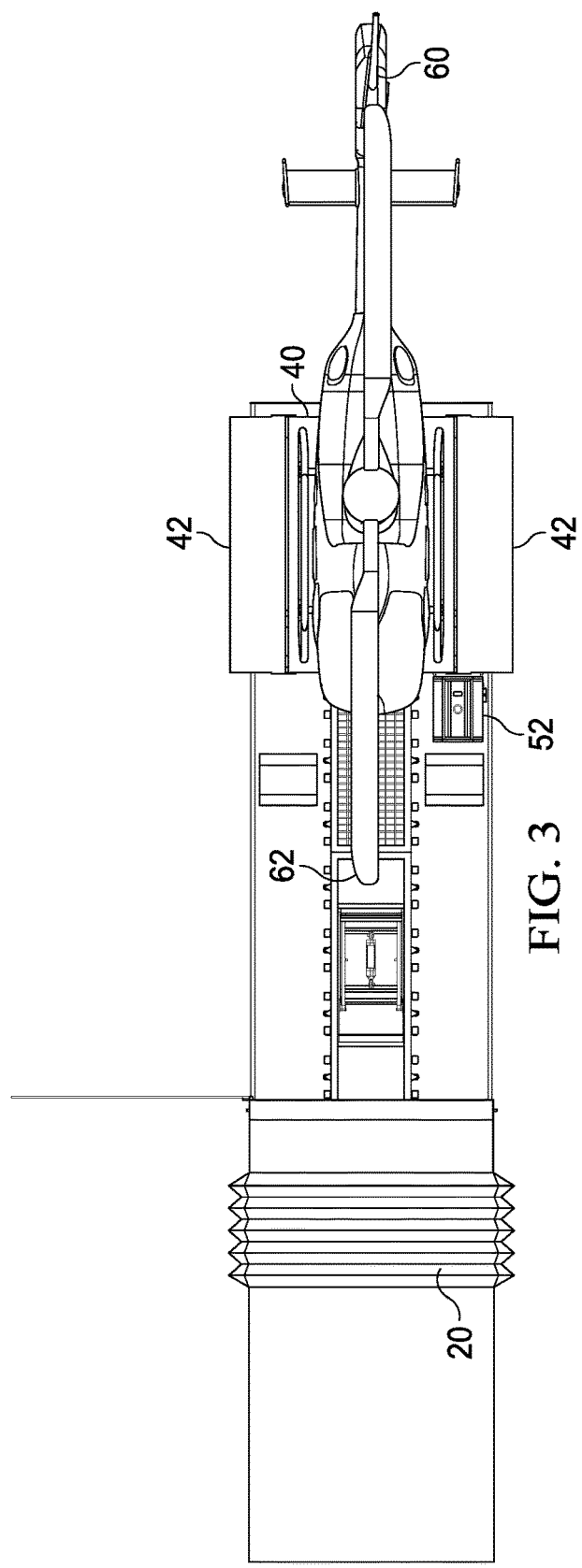
FIG. 3 illustrates a top view of the rotorcraft resting on the landing pad of the trailer in the launch or landing position according to a preferred embodiment of the present invention.

As shown in FIGS. 2 and 3, once pad 40 has been moved to the desired location at the rear of trailer 10, the pad 40 may be secured and locked to prevent movement along the length of back rail 30. Pad wings 42 located on opposing sides of pad 40 are then unfolded and supported by side rails 32 which have rollers 36 spaced along the length of each side rail as shown in FIG. 1. Pad wings 42 provide additional surface area for pad 40 and allow for the operator and pilot to stand on the pad 40 area while preparing the rotorcraft 60 for flight operations. As previously described, curtain wall 20 has been slidably retracted to the forward portion of trailer bed 12 with adequate clearance between the rotor blades 62 of rotorcraft 60, curtain wall 20 and swing door 26 to prevent rotor blades 62 from striking any portion of the trailer 10, curtain wall 20 or swing door 26. Generator 52 provides an electrical power source for use to power pump and tankage 50 equipment which may be installed on trailer 10 for refueling and chemical supply to the rotorcraft 60 during aerial spray operations. Additional storage, tankage or other equipment may be transported in the storage area 13 of the trailer 10.

In one embodiment, the invention disclosed herein may include a chemical mixing system attached on or about trailer 10 for use in connection with aerial spray operations conducted by the rotorcraft. Trailer 10 may include a chemical mixing system utilizing a compressor that generates vacuum and pressure within a mixing vessel. No pump is required in this embodiment. Using the Venturi principle, a vacuum is created in a pressure vessel to a batch boy tank, which is used to measure out the desired volume of chemical for mixing. To deliver the desired volume of chemical to the mixing vessel, the batch boy tank is exposed to atmospheric pressure and the chemical is delivered to a mixing vessel via the hosing connections between the pressure vessel, batch boy tank, and mixing tank which are in fluid communication. Once the desired chemical mixture is created, pressure is applied to the mixing vessel which delivers the chemical mixture to the rotorcraft spray tank for aerial application.

After rotorcraft operations are ceased, rotorcraft 60 returns and lands on pad 40 and rotorcraft 60 is shut down. Rotor blades 62 are aligned substantially parallel to the length of the trailer bed 12 and pad wings 42 are returned to the folded position. Pad 40 may then be moved and translated, by hand or mechanically, forward towards the front end of trailer 10 along the length of back rail 30 and front rail 34 so as to move the position of rotorcraft 60 above or over the axle wheels 16 to the substantially center portion of trailer 10. The pad 40 is then lowered by actuation of the scissor lift 38 supporting front rail 34 upon which pad 40 rests. Curtain wall 20 is then drawn to the end of trailer 10 and swing door 26 is closed to form the enclosed trailer 10 shown in FIGS. 4 and 5 containing rotorcraft 60.

Turning to FIGS. 4 and 5, trailer 10 is shown in the transport and storage configuration where curtain wall 20 is extended along the length of the trailer 10 and swing door 26 is in the closed position creating a secure and weather resistant shelter for rotorcraft 60 during transportation or during storage of rotorcraft 60. During storage, jackstands 54 are extended to allow tractor 63 to separate from trailer 10 and to maintain trailer 10 in a stable position for storage of rotorcraft 60. During transport operations, jackstands 54 are retracted once tractor 63 is attached to trailer 10.

It is to be understood that the implementations are not limited to particular apparatus or methods described herein, which may, of course, vary. For example, the trailer need not be limited to specific materials for manufacture of the trailer or for the types of uses described herein. The trailer may be used to transport and store other aircraft or vehicles and the disclosure is not to be construed as limiting to just rotorcraft. Additionally, the trailer apparatus and methods described herein may be adapted for use with various technologies, environments, and applications, including agriculture applications, powerline observation operations or military applications. Moreover, the invention defined by the above paragraphs is not to be limited to particular details set forth in the above description, as many apparent variations thereof are possible without departing from the spirit or scope of the present invention. It is also to be understood that the terminology used herein is for the purposes of describing particular implementations only and is not intended to be limiting.

We claim:

1. An apparatus, comprising;
   a trailer comprising a trailer bed attached to a trailer frame supported by a wheel axle;

a front rail with at least one attached roller;
an elevator for raising and lowering the front rail;
a pad for supporting an aircraft;
a pad wing attached to the pad; and,
a curtain wall attached to the trailer.

2. The apparatus of claim 1, comprising:
a storage tank, a pump, and a generator.

3. The apparatus of claim 1, comprising:
a swing door.

4. The apparatus of claim 1, comprising:
a back rail with at least one attached roller.

5. The apparatus of claim 1, comprising:
a side rail with at least one roller.

6. The apparatus of claim 1 wherein the aircraft comprises a helicopter, a rotorcraft, a fixed wing aircraft or a drone.

7. The apparatus of claim 1, comprising:
a spar slidably connected to the trailer.

8. A method, comprising:
placing an aircraft on a pad resting on a back rail supported by a trailer;
moving the pad along the back rail to a position over a front rail connected to an elevator; and,
lowering the pad with the elevator.

9. The method of claim 8 further comprising:
extending a curtain wall substantially about the trailer.

10. The method of claim 8 further comprising:
folding a pad wing to increase or decrease the pad area.

11. The method of claim 9 further comprising:
closing a swing door to substantially enclose the aircraft within the trailer.

\* \* \* \* \*